United States Patent [19]

Lynott et al.

[11] 3,757,030

[45] Sept. 4, 1973

[54] CONTINUOUS SPIRAL, ROTATING HEAD AND DISK VIDEO BUFFER SYSTEM

[75] Inventors: John J. Lynott, Los Gatos; Louis D. Stevens, Saratoga, both of Calif.

[73] Assignee: International Business Machines Corporation, Armonk, N.Y.

[22] Filed: Jan. 5, 1971

[21] Appl. No.: 104,108

[52] U.S. Cl. .......................... 179/100.2 T, 274/41.4

[51] Int. Cl. ........................ G11b 15/12, G11b 15/18

[58] Field of Search ............ 179/100.2 CA, 100.2 T; 346/74 MD, 137; 274/41.4, 4 J, 9 RA; 340/174.1 C

[56] References Cited

UNITED STATES PATENTS

| | | | |
|---|---|---|---|
| 3,402,403 | 9/1968 | Lichowsky | 179/100.2 T |
| 3,500,363 | 3/1970 | Shill | 340/174.1 C |
| 890,195 | 6/1908 | Stuart | 179/100.2 R |

OTHER PUBLICATIONS

IBM Technical Disclosure Bulletin, D. E. Eastwood "Stacked Disk Recorder," Vol. 4, No. 1, June 1961 p. 12

*Primary Examiner*—Vincent P. Canney
*Assistant Examiner*—Jay P. Lucas
*Attorney*—Hanifin and Jancin and Shelly M. Beckstrand

[57] ABSTRACT

A video buffer includes a disk and a head rotating about parallel axes, offset by about one half the width of the data tracks band on the disk. Two heads are mounted 180° apart equidistant from the disk of head rotation. The heads and the disks are rotated at a constant ratio such that a spiral track is traced across the recording area of the disk by the head. The first head is rotated through 180° while the second head is rotating to a home position; the heads are switched at that point for a continuous readout. The ratio of disk to head rotational velocity is 20:1 for a ten track spiral.

6 Claims, 2 Drawing Figures

INVENTORS.
JOHN J. LYNOTT
LOUIS D. STEVENS
BY Shelley M. Beckstrand
ATTORNEY

CONTINUOUS SPIRAL, ROTATING HEAD AND DISK VIDEO BUFFER SYSTEM

CROSS REFERENCES

Copending U.S. Pat. application by John J. Lynott for a magnetic head accessing method, Ser. No. 104,107, now U.S. Pat. No. 3706857 filed Jan. 5, 1971, and of common assignee.

U. S. Pat. application Ser. No. 782,154, filed Dec. 9, 1968 by Caroll J. Brown et al. for a video display system now abandoned.

FIELD OF THE INVENTION

This invention relates to a magnetic recording and reproducing apparatus, and more particularly to means for positioning a transducer for cooperative engagement with a continuous spiral track on a magnetic recording medium or member in a video buffer.

BACKGROUND OF THE INVENTION

Prior Art

The video display system of the Brown et al. application referred to above utilizes a digital storage and processor having stored therein a plurality of binary coded information representative of a plurality of displays. A graphic generator converts the coded information into analog stroke or painted display information. This stroke information is converted into television raster information which is then cyclically stored on a magnetic disk, together with displays from other non-coded sources as well as live television. A plurality of remote stations and select binary coded display information which is converted to raster information. These frames and the alternative raster inputs may be recorded on one or more tracks of the magnetic disk. This information is then applied to the television monitor at the station. The operator at the station can then process the binary coded information and request other display material while viewing the monitor and in addition, can compare points on the CRT display with the developed stroke information. Furthermore, raster information of two selected tracks can be compared and/or mixed. In the Brown application, the magnetic disk storage means 70 comprises a large, i.e., 24 inch diameter, disk. This extermely large disk was necessary to give a recording track TRn of sufficient length. The length is dictated by the large amount of data which had to be stored in the said track for a given stop frame sequence. This large data content requirement is offset by the resolution or data packing capability of the disk. That is, for a smaller disk, the magnetic bits or flux reversals required for the large data content required in the track would be packed too close together. Consequently, the longer track or larger diameter disk was required.

Long spiral tracks on a cyclical magnetic memory have been suggested in the art and implemented by driving a magnetic transducer on a lead screw which is rotating at a constant velocity with respect to the rotating magnetic medium, such as a disk or drum. These approaches present severe reset problems associated with returning the head to the zero or start position, as well as complicated mechanisms for driving the head along a lead screw with severe registration problems associated with wear of the lead screw.

As discussed in the Lynott application referred to above, various schemes for rotating a magnetic transducer and the associated magnetic disks about parallel offset axes have been suggested. However, the various approaches suggested in the art suffer from severe head skew problems, positional accuracy, or require that the head leave the surface of the disk at some point during it rotation, or that the direction of rotation be reversed to maintain the head in contact or flying engagement with surface of the disk.

SUMMARY OF THE INVENTION

It is an object of the invention to provide an improved mechanism for causing a head to scan a spiral track on a rotating disk.

It is a further object of the invention to provide an improved video buffer memory of simplified design and lower cost.

It is a further object of the invention to provide an improved video buffer disk wherein the data is contained in a spiral track on a small diameter disk.

It is a further object of the invention to provide magnetic recording memory apparatus where both the disk and the head are constantly rotated at a given ratio and where the head never leaves the surface of the disk.

It is a further object of the invention to provide a video buffer memory utilizing a cyclical magnetic disk wherein a magnetic transducer traverses a spiral track with respect to said disk, and yet the direction of travel of the head need not be reversed to restore said head to the beginning of said spiral track.

The invention provides a video buffer memory including a disk rotating about a first axis at a constant speed. One or more magnetic heads are mounted in recording relationship to said disk and rotated about an axis parallel and offset from the axis of rotation of the disk by an amount essentially equal to one half the width of the data bearing region of the disk. A plurality of pairs of magnetic heads may be mounted, each head of a pair at the same radius and separated by 180°, and electronically switched at the home position for achieving a constant reading of a given spiral track.

The foregoing and other objects, features, and advantages of the invention will be apparent from the following more particular description of the preferred embodiments of the invention as illustrated in the accompanying drawings.

DESCRIPTION

Figure 1:
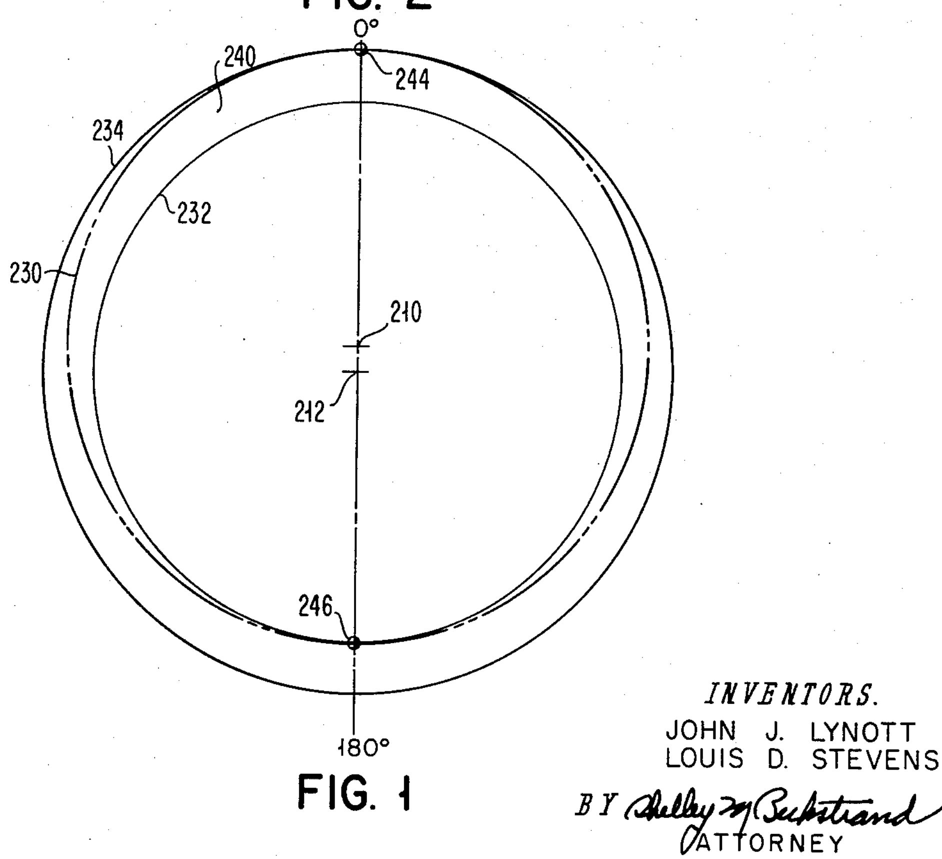
FIG. 1 is a diagrammatic view showing the travel of one pair of heads with respect to the offset parallel axes of rotations of the head and disk and with respect to the data bearing region or data band of the disk.

Referring first to FIG. 1, a description will be given of the head path of a pair of heads, each mounted at equal radii positioned 180° apart for rotation about a center line which is parallel to and offset from the axis of rotation of the disk. Disk 240 is mounted for rotation about axis 212 and includes a data bearing region or data tracks band between the outside diameter 234 and the inside diameter 232. The outside diameter of disk 240 is slightly larger than the outside track 234, larger by an amount at least sufficient to permit the heads to engage the outside data track 234. In the event that the axes' offset is larger than one half the data tracks bandwidth, the disk 240 outside diameter is large enough to assure that head 240 is does not leave the disk 240 surface while being rotated to the home position.

Magnetic heads 244 and 246 are mounted at equal radii from the axis of rotation 210, and are driven so as to rotate about said axis. For head A to traverse a ten spiral track as it rotates from the zero position to the 180° position, the ratio of head and disk rotation must be 20 revolutions of the disk for each full revolution of the head 244. Thus, axis 210 is positioned inside of inside diameter 232 such that as head 244 rotates from the zero degree to the 180° position along path 230, it travels from the data outside diameter 234 to the inside data diameter 232 to traverse a spiral track with respect to disk 240, which is rotating about axis 212. While head 244 is rotating from the zero to the 180° position, head 246 is rotating from the 180° position back to home at the zero degree position. As head 246 reaches the home position, the heads are electronically switched so that head 246 is now operative and scans the identical spiral track previously followed by head 244. As will be apparent to those skilled in the art, various commutating methods or means for electronically switching the heads and for communicating between said heads and associated logic in control circuitry may be employed.

As will also be apparent to those skilled in the art, a plurality of pairs of heads 244, 246 may be mounted, each head of each pair at the same radii, but with each pair of heads at different radii such that said pairs of heads follow different, interleaved spiral tracks on the disk 240 between the tracks 234 and 232. (The heads of a pair may be at different radii if offset by other than 180° to still scan the same spiral track.)

Figure 2:
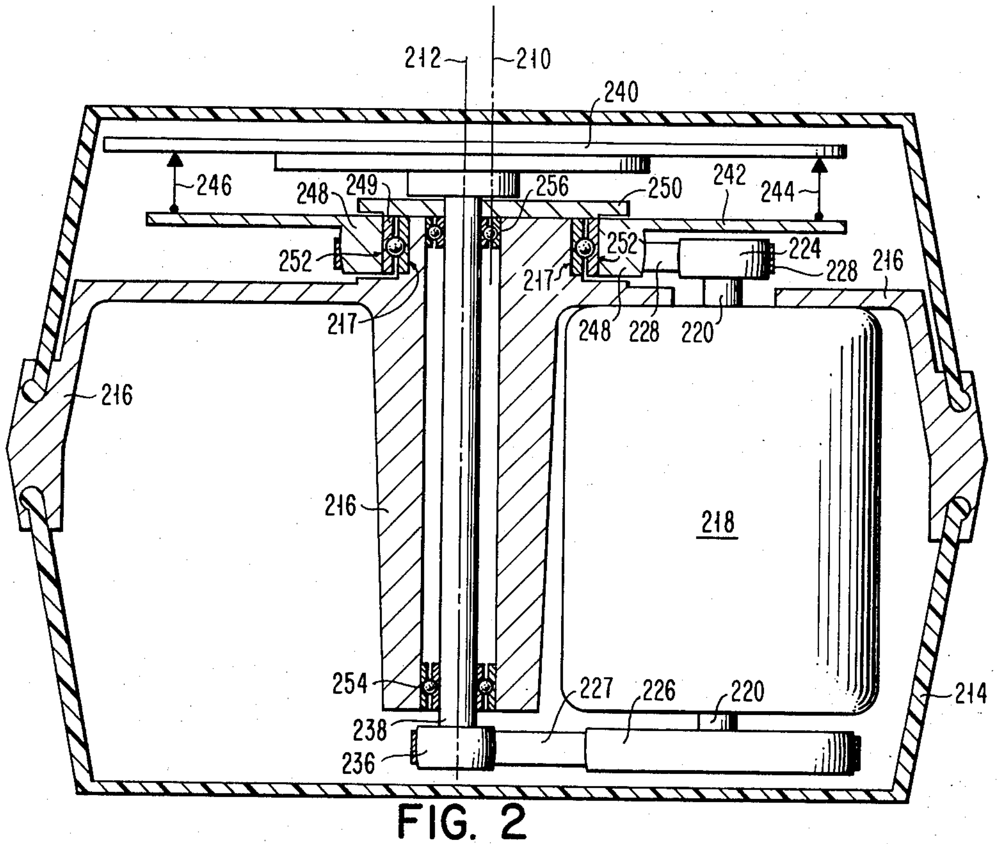
FIG. 2 is a partially cutaway diagrammatic view of the invention for rotating a pair of magnetic heads about an axis offset and parallel to the axis of rotation of the associated disk at a constant velocity ratio.

Referring now to FIG. 2, an explanation will be given of the apparatus for rotating heads 244 and 246 about an axis offset and parallel to the axis 212 of rotation of disk 240 at a relative constant velocity ratio. Mounted within covers 214 and base 216, base 216 has an annular sleeve whose outside circumference 217 forms a cylinder having an axis 210. Axis 210 serves as the axis of rotation of heads 244 and 246 as will be described below. Securely mounted to base 216 is motor 218 having shaft 220. Mounted at one end of shaft 220 is drive hub 224 and at the other end is drive hub 226. Mounted within base 216 by bearings 254 and 256 is disk drive shaft 238. Disk drive shaft 236 is mounted to said shaft and is driven by motor 218 through belt 227 at a constant rotational velocity. Disk 240 is mounted to said shaft 238 for rotation therewith. Head mounting disk 242 has a hub portion 248 forming an inner bearing brace 252 and is mounted by bearings 249 to the annular bearing surface 217 of base 216. Magnetic disk 242 is rotated about 218 by belt 228 which engages the outside surface of hub 248 and is driven by motor 218 through drive hub 224. The data disk 240 and the head mounting disk 242 are driven at the constant ratio determined by the gearing ratio between the hubs 224, 248, 226, and 236. Head mounting disk 242 is secured to base 216 by seal plate 250.

In operation, motor 218 is driven at a constant velocity thereby driving driving hubs 224 and 226. Disk 240 is driven at a first velocity by shaft 238 which is connected to motor 218 through hubs 236 and 226 and belt 227. Motor 218 drives the head mounting disk 242 at a second velocity through hubs 224 and 248 and belt 228. Heads 244 and 246, which may be similar to those of U.S. Pat. No. 3,349,384, are loaded against the bottom surface of disk 240 and traverse spiral tracks on the data bearing region of disk 240 as heads 244 and 246 are rotated about axis 210 while disk 240 is being rotated about axis 212.

As will be apparent to those skilled in the art, various forms of taking power from motor 218 to drive disks 240 and 242 will be employed, including gears, belts, friction rollers, and the belt systems described.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. A method for scanning a spiral data track on a magnetic disk, said method comprising the steps of rotating said disk about a first axis and at a first velocity, and rotating at least one pair of transducers in cooperative relationship with said disk at a second velocity about a second axis parallel to and offset from said first axis by a distance less than the inside radius of said spiral track and by a distance substantially equal to one half the difference between the outside and inside radii of said spiral track, and transducers being located on the same radius and offset by substantially 180°, selectively activating said transducers to selectively read or write magnetic data in said track;

said second velocity being less than said first velocity, whereby a continuous spiral is scanned through a plurality of revolutions of said disk.

2. The method of claim 1 further comprising the step of rotating a plurality of transducers in cooperative relationship with said disk at said second velocity about said second axis parallel to and offset from said first axis for scanning a plurality of interleaved spiral tracks.

3. A method for scanning a plurality of spiral tracks on a magnetic disk, comprising the steps of rotating said disk about a first axis and at a first angular velocity, and rotating a plurality of pairs of transducers in cooperative relationship with said disk at a second angular velocity less than said first velocity about a second axis parallel to and offset from the first axis by a distance less than the inside radius of the innermost track and substantially equal to one half the difference between the outside and inside radii of each said spiral track, the transducers of each said pair scanning one of said plurality of spiral tracks during some portion of a full revolution of said transducers about their axis.

4. The method of claim 3 wherein both transducers of a given pair of transducers are positioned at the same radius about their axis of rotation and are offset by 180°.

5. An apparatus for positioning a magnetic transducer from at least one pair of magnetic transducers in cooperative relationship with a spiral track on a magnetic recording surface, comprising first rotating means for rotating said recording surface about a first axis at a first angular velocity, and second rotating means for rotating said transducer about a second axis at a second angular velocity, said first axis being parallel to said second axis and spaced therefrom by a distance which is less than the innermost radius of the spiral track and substantially one half the difference between the inside and outside radii of the spiral track, said first and second rotating means having a substantially constant ratio of relative angular velocity with said first velocity greater than said second velocity, and switching means for establishing a read/write relationship with each transducer as it begins to scan said spiral track.

6. The apparatus of claim 5 further comprising a plurality of pairs of transducers for scanning a plurality of spiral tracks, the transducers of each pair being positioned at predetermined radii and offset for scanning one of said plurality of spiral tracks.

* * * * *